May 29, 1951    K. M. TAYLOR    2,555,279
ABRASIVE WHEEL AND METHOD OF MANUFACTURE THEREOF
Filed April 8, 1949
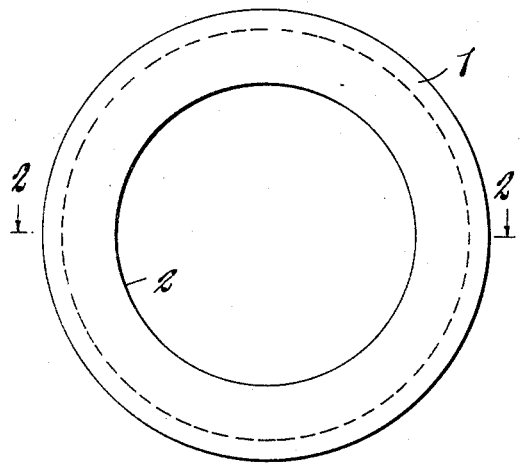
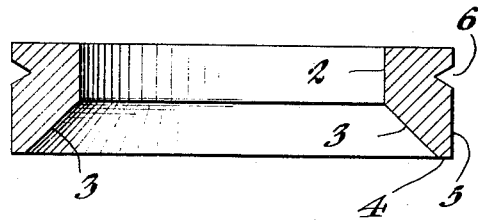
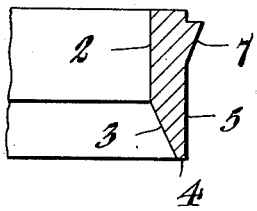
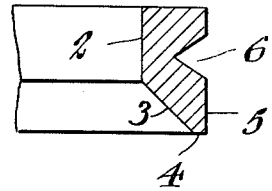
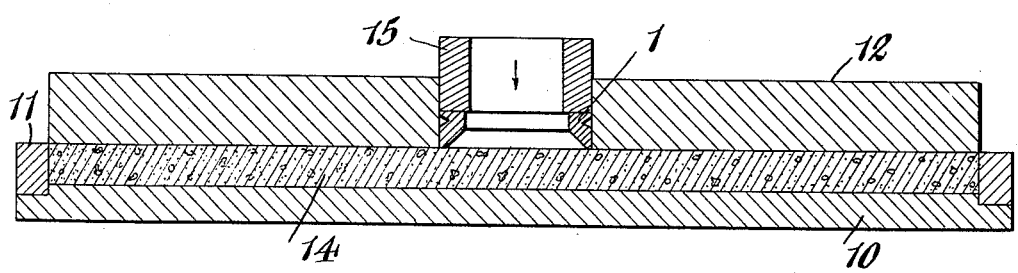
Inventor
KENNETH M. TAYLOR
by W Poole
Attorney Patented May 29, 1951

2,555,279

UNITED STATES PATENT OFFICE 2,555,279

ABRASIVE WHEEL AND METHOD OF MANUFACTURE THEREOF

Kenneth M. Taylor, Niagara Falls, N. Y., assignor to The Carborundum Company, Niagara Falls, N. Y., a corporation of Delaware Application April 8, 1949, Serial No. 86,166

11 Claims. (Cl. 51—168)

This invention relates to abrasive wheels provided with an improved bushing and methods of manufacture thereof. It is particularly concerned with the production of very thin abrasive wheels commonly known as "cut-off" wheels.

One method which is commonly employed in the manufacture of cut-off wheels using resins or rubber as the bond consists in first preparing a distributable type of abrasive mix wherein the abrasive grains are individually coated with the bonding material and the mix is of such condition that it is pourable and readily distributable. Methods of making such mixes are well known in the art and are illustrated by U. S. Patents Re. 19,318 and 2,114,636. In making such mixes with a resin bond the abrasive grain is first coated with a so-called "plasticizer" or wetting agent for the powdered resin and the wetted grains are then mixed with the powdered bond. The wetting agent and the bond are selected in such proportion that all of the powdered bond is caused to adhere to the grains and yet the outer surfaces of the bond coatings on the grains are dry to the touch.

In molding articles from such mixes it is customary to provide a mold having a removable bottom plate, a barrel which is a circular ring having an inside diameter corresponding to the diameter of the article to be molded and a top plate having an outside diameter slightly less than the inside diameter of the barrel. The bottom plate is provided with a central hole in which is placed a pin for making the arbor hole in the center of the molded article. These wheels are very thin, ranging in thickness from about 1/16 to 1/8 inch, more or less, in thickness and difficulty is experienced in distributing the mix in the mold in such manner that the wheel is uniform in thickness and structure. This difficulty is increased because of the presence of the arbor pin since in trying to strike off the top surface of the mold contents to obtain a smooth level surface the pin in the center of the mold interferes with the strike which is used to smooth off the mold contents. Unless the mold is filled in such a manner that the quantity of mix per unit area is uniform over the entire area of the wheel the wheel will vary in density and such variation causes the wheels to be out of balance and increases the tendency for them to bloat when the articles are heat-treated to cure the bond.

In the past it has been the practice to provide such wheels with an arbor hole which may or may not be provided with a bushing. The wheels are mounted on a spindle when they are used and it is desirable to have a metal bushing in order to be certain that the wheel is exactly centered. According to prior practice, where bushings are to be provided, the bushings are stampings from sheet steel which are held in the wheel by fins which are embedded in one of the flat faces of the wheel. These bushings require the use of an arbor pin in the molding process and have the further objection that they are not held securely in the wheel.

One of the objects of the present invention is to provide an abrasive wheel having an improved bushing. A second object of the invention is to provide an improved method for making abrasive wheels from mixes of the distributable type. Still another object of the invention is to provide a bushing for an abrasive wheel which acts as an arbor hole cutter during the molding operation and as a bushing in the finished wheel. Other objects of the invention will appear from a consideration of the disclosure herein made.

I have found that the objects of the invention can be accomplished by providing a bushing of the type illustrated in the drawings and by carrying out a method employing apparatus of a type illustrated in the drawing and steps as hereinafter described.

Referring to the drawings,

Figure 1 is a plan view of a bushing employed in my invention;

Figure 2 is a section along the lines 2—2 of Figure 1;

Figure 3 is an enlarged partial section of an alternative design of bushing;

Figure 4 is an enlarged partial section of a modification of the bushing of Figure 2;

Figure 5 is a section of a mold filled with abrasive mix and prepared for the pressing operation; and Figure 6 is an enlarged partial section of still another modification of the bushing of Figure 2.

In the drawings the bushing 1 comprises a straight inner portion of uniform diameter 2, a tapered end portion 3, straight outer portions 5, and recessed portions 6 shown in Figures 2 and 4 or projecting portion 7 shown in Figure 3, or a knurled outer portion 8 as shown in Figure 6.

Referring to Figure 5, the apparatus includes a bottom plate 10, mold barrel 11 and top plate 12. The top plate is positioned on the abrasive mix 14 and is provided at its center with a bushing 1 and bushing pin 15.

In carrying out the invention I prepared distributable mixes, representative compositions of which are as follows:

Example I

| | Per cent |
|---|---|
| 30 grit fused alumina abrasive | 77 |
| Liquid phenolic resin | 3.4 |
| Powdered "A" stage phenolic resin | 13.6 |
| Cryolite | 6.0 |

The liquid resin was an alkali-catalyzed condensation product of phenol and formaldehyde having a viscosity of 500 cp. at 25° C. and convertible by heat to a hard, strong, infusible, insoluble condition. The powdered resin was a similar condensation product modified by the inclusion of chromic oxide and made according to U. S. Patent 2,371,915.

The mixture was made by first mixing the abrasive grain with a liquid resin until the resin was uniformly distributed over the grains and then the powdered resin and cryolite, which had been pre-mixed, was added and stirred with the wetted abrasive grains.

Example II

A typical distributable mix using a form of modified rubber was made of the following composition:

| | Per cent |
|---|---|
| 54 grit fused alumina abrasive | 63.75 |
| Decomposed rubber | 7.5 |
| Sulfur | 3.75 |
| Whiting | 25 |

The decomposed rubber was made by heating natural rubber to a temperature of 400–450° F. for about 3 hours during which time the rubber changed from its normally solid condition to a liquid which was quite viscous when cooled to room temperature as described and claimed in U. S. Patent No. 2,114,636.

The abrasive grain is mixed first with the liquefied or decomposed rubber and then with the powdered ingredients which are pre-mixed before adding to the rubber. After mixing, the mass is screened to separate the individual particles.

In carrying out the process of the invention a mold consisting of bottom plate 10 and mold barrel 11 is filled with the mixture as by screening a mix into the mold cavity. The mix in the mold is then struck off with a bar level with the top of the mold barrel. The top plate 12 is then placed on the mix, a bushing 1 is put into the hole in the top plate and the bushing pin 15 is put on the bushing 1. The assemblage is then put into a suitable press and the press is closed, whereupon the bushing pin 15 forces the combined arbor hole cutter and bushing 1 down through the mix so that the bushing is positioned within the wheel. The mass is then compacted according to usual practice such as at a pressure of 3000 p. s. i. where a mix made according to Example I is used. When this pressure is applied portions of the mix adjacent the outside of the arbor hole are forced into the recesses 6 so that the bushing is firmly anchored in the pressed article. After pressing, the mold is disassembled by removing the top plate 12 and the bushing pin. The molded article is transferred to a suitable support and heat treated to cure the bond. A suitable heat treatment for a resinoid mix such as is described in Example I is 24 hours at 135° F. followed by 16 hours at 150° F. and increased to 300° F. at the rate of 25° C. per hour and a final treatment of 16 hours at 300° F.

In molding a rubber bonded mix of the type described in Example II a suitable process is an initial pressing at 2200 p. s. i. for 5 minutes at 250° F. followed by an oven cure according to the following cycle:

1 hour at 200° F.
3 hours at 225° F.
3 hours at 275° F.
15 hours at 300° F.
3 hours at 325° F.

The dimensions of the bushings used in the invention may be varied to some extent, but in general I have found it desirable to keep the thickness of the bushing at the leading or thinner edge of the order of .010–.015 inch. This edge acts as the cutter during the molding process and is also convenient when the wheel is mounted for use since it facilitates mounting of the wheel on the spindle. As is indicated in the drawings, the shape of the outer portion of the bushing may vary provided that this portion is so designed as to anchor the bushing in the wheel due to pressing of the mix into recesses of the kind shown in Figures 2 and 4 or in recesses such as are formed by knurling the outside of the bushing or otherwise treating the outer portion of the bushing to provide a surface of varying diameter.

The invention has been described with specific examples showing, respectively, a phenol-formaldehyde resin and a liquefied or decomposed rubber bond. The method is equally applicable to other types of bonds such as those provided by one of the synthetic elastomers or by other resins such as a urea or melamine formaldehyde condensation products. Similarly, the exact composition of the mix is not critical and modifications common in the art may be practiced so long as the mixture is distributable to provide a thin layer of uniform thickness and density. The invention is therefore not to be limited to the specific examples of compositions or designs of bushings herein described but is rather to be considered as having the scope defined in the appended claims.

I claim:

1. An organic bonded abrasive wheel having a central arbor hole provided with a combined bushing and arbor hole cutter having an inner bearing surface of substantially uniform inside diameter from one end through a portion of its length and a tapered portion at the other end such that the inner diameter is greatest at that end, and an outer surface of varying diameter whereby the bushing is retained in the wheel and prevented from moving along the longitudinal axis thereof, said tapered portion being of such thickness at its outer end that the bushing can be forced into an uncompacted mass of wheel mix and will act to cut the arbor hole in which the bushing is mounted in the finished wheel.

2. An abrasive wheel as claimed in claim 1 wherein the thickness of the bushing at the tapered end is of the order of .010–.015 inch.

3. An abrasive wheel as claimed in claim 1 wherein the outer portion of the bushing is recessed to provide the anchorage in the abrasive body.

4. An abrasive wheel as claimed in claim 1 wherein the outer portion of the bushing is recessed at the portion of the bushing which provides the inner bearing surface.

5. An abrasive wheel as claimed in claim 1 wherein the outer portion of the bushing is knurled.

6. A combined bushing and arbor hole cutter for an abrasive wheel having an inner bearing surface of substantially uniform inside diameter from one end through a portion of its length and a tapered portion at the other end, such that the inner diameter is greatest at that end and an outer surface of varying diameter, the thickness at the tapered end being such that the bushing will cut its way through an uncompacted mass of abrasive mix and thereby form the arbor hole in which it is mounted and the variation of the outer diameter being sufficient to anchor the bushing in the formed wheel and prevent it from moving along the longitudinal axis thereof.

7. A bushing as claimed in claim 6 wherein the thickness of the bushing at the tapered end is of the order of .010–.015 inch.

8. A bushing as claimed in claim 6 wherein the outer portion of the bushing is recessed to provide the anchorage in the abrasive body.

9. A bushing as claimed in claim 6 wherein the outer portion of the bushing is recessed at the portion of the bushing which provides the inner bearing surface.

10. A bushing as claimed in claim 6 wherein the outer portion of the bushing is knurled.

11. A method of making an organic bonded abrasive wheel which comprises providing a distributable mixture of abrasive grains coated with an organic bond, forming an uncompacted disc from the mix, forcing a combined bushing and arbor hole cutter having an inner bearing surface, a tapered leading edge, and an outer surface of varying diameter into the uncompacted mix at the center of the said disc, applying pressure to the formed article to compact the mix and force it around the bushing to anchor the bushing in the formed wheel, removing the abrasive mix from the interior of the bushing, and curing the organic bond.

KENNETH M. TAYLOR.

REFERENCES CITED

The following references are of record in the file of this patent:

UNITED STATES PATENTS

| Number | Name | Date |
|---|---|---|
| 832,884 | Traub | Oct. 9, 1906 |
| 1,499,345 | Chott | July 1, 1924 |
| 1,616,531 | King | Feb. 8, 1927 |
| 1,626,246 | Martin | Apr. 26, 1927 |
| 1,634,708 | Chayes | July 5, 1927 |
| 1,981,970 | Sanford | Nov. 27, 1934 |
| 2,015,727 | Prey | Oct. 1, 1935 |
| 2,196,090 | Stone et al. | Apr. 2, 1940 |
| 2,223,392 | Smith | Dec. 3, 1940 |
| 2,254,612 | Martin | Sept. 2, 1941 |
| 2,356,965 | Allison | Aug. 29, 1944 |

FOREIGN PATENTS

| Number | Country | Date |
|---|---|---|
| 20,728 | Norway | Apr. 7, 1910 |